June 11, 1929.    O. C. R. WOLLER    1,716,940

BRACKET

Original Filed July 13, 1925

INVENTOR.
Oliver C. Ritz Waller
BY
Friese & DeBusk
ATTORNEYS

Patented June 11, 1929.

1,716,940

UNITED STATES PATENT OFFICE.

OLIVER C. RITZ WOLLER, OF CHICAGO, ILLINOIS.

BRACKET.

Original application filed July 13, 1925, Serial No. 43,105. Divided and this application filed January 14, 1926. Serial No. 81,264.

This invention relates to supporting brackets and is particularly adaptable to a variety of relatively positioned bracket securing means.

This application is a division of my co-pending application Serial No. 43,105, filed July 13, 1925.

The principal objects of the present invention are—

To provide an improved supporting bracket adaptable to varied arrangements of securing means whereby the device to which it is attached may be secured in position on an automobile or other body, by means of bolts extending through holes arranged at various distances apart and at a variety of angular positions with respect to each other and to the device;

To provide a structure readily adaptable to a large variety of relatively positioned securing means; and To improve devices of this type in various ways hereinafter more specifically pointed out.

What I claim to be new and desire to secure by Letters Patent is set forth in the appended claims.

An illustrative embodiment of the invention is shown in the accompanying drawings, in which,—

Figure 1:
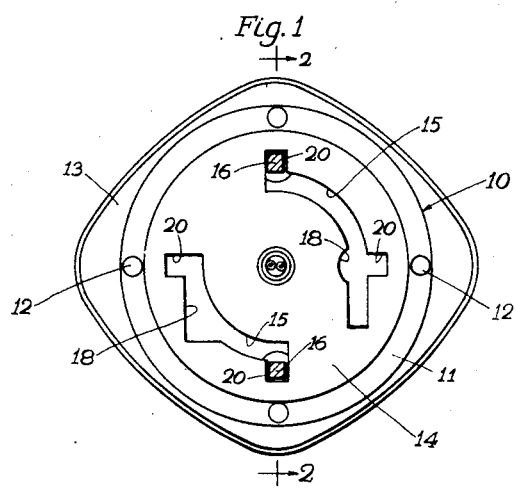
Fig. 1 is a rear face view of a lamp provided with a preferred embodiment of my invention.
Figure 2:
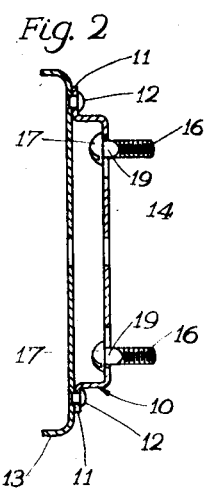
Fig. 2 is a sectional elevation of the parts shown in Fig. 1 substantially as indicated by the line 2—2 of said figure.

Referring to the drawing, a bracket element 10 of substantially cup-like form and having an offset marginal flange 11 may be secured by means of rivets 12 to a casing or housing 13 typifying a lamp house for warning light devices such as automobile tail lights, stop lights, etc., or other devices which it may be desired to secure to the frame of an automobile or other body.

The bracket 10 may comprise a body portion 14 having a plurality of slots 15 formed therein for receiving bolts 16 by which the bracket may be secured to an automobile or the like. By reason of the offset relationship of the flange 11 with respect to the body portion 14 of the bracket, a space is provided between the bracket and the housing 13 for the accommodation of the heads 17 of the bolts 16. To permit of the insertion of the bolt heads 17 into the space thus provided, the slots 15 may be provided with enlarged portions 18 of substantially greater dimensions than the general width of the slots. The bolts 16 may be provided with squared shoulder portions 19 adapted to be received by the slots 15 in a manner to prevent rotation of the bolts therein.

Figure 3:
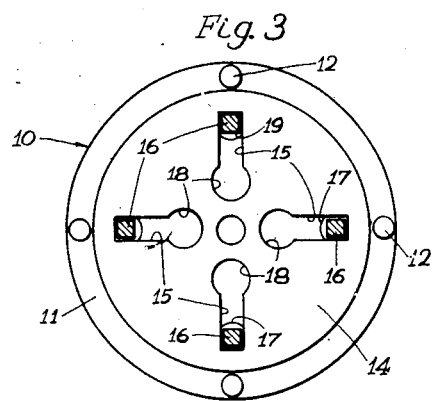
Figs. 3 and 4 illustrate modified constructions of brackets embodying the invention.
Figure 4:
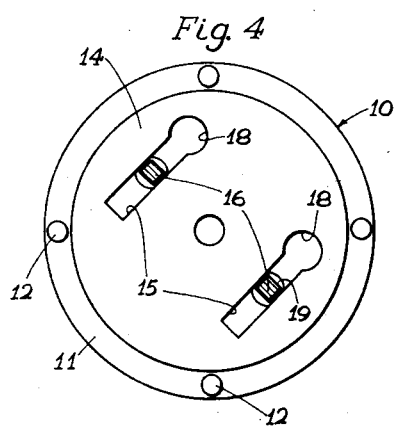

The slots 15 may be of a variety of forms and variously positioned angularly with respect to each other. For example, they may be of substantially arcuate formation, and oppositely disposed with respect to each other and have their enlarged portions positioned intermediate their ends as shown in Fig. 1, or they may be substantially straight oppositely disposed radially extending slots with their enlarged portions at the ends of the slots as shown in Fig. 3, or the slots may be positioned in oppositely disposed substantially parallel relationship as shown in Fig. 4 with the enlarged portions formed at the ends of the slots. The slots 15 may be provided also with laterals 20 providing oppositely disposed aligned portions as shown in Fig. 1, or these laterals may be variously positioned with respect to the slots and to each other.

To mount the bracket 10 in position on its support, the heads 17 of the bolts 16 are inserted into the space between the bracket and the housing 13 through the enlargements 18 of the slots 15, and the bolts 16 moved along the reduced portions of the slots until the bolts come into register with the holes formed in the automobile chassis or other body to which the bracket is to be secured; then by inserting the bolts 16 through said holes and applying nuts to the threaded ends thereof, the bracket may be drawn up snugly, and securely clamped to its support.

It will be observed that by the use of the invention above described, the bracket 10 is adaptable to varied arrangements of securing means whereby a tail light or other warning light device may be secured in position on an automobile or the like, by means of bolts extending through holes arranged at various distances apart and at a variety of angular positions with respect to each other and to the device.

The present invention is not limited to the specific construction and arrangement shown and described, except so far as such construction is specifically claimed, but may be variously modified without departing from the principles of the invention.

I claim:

1. A bracket having a body portion and an offset marginal flange portion, said body portion being provided with oppositely disposed substantially arcuate slots having enlarged portions and oppositely disposed radially extending laterals communicating therewith, the laterals of one slot being aligned with the oppositely disposed laterals of the other slot.

2. A bracket for a lamp casing in the form of a plate provided with oppositely disposed slots in substantially diagonal position therein for accommodating adjusted positions of bolts for securing the device in position, said slots being provided with oppositely disposed aligned portions at one point and with other oppositely disposed aligned portions at right angles with respect to said first named aligned portions.

3. A bracket for a lamp casing in the form of a plate provided with oppositely disposed slots having enlarged portions for the insertion of the heads of bolts for securing the device in position, each of said slots comprising two portions at right angles with respect to each other, such portions being connected by diagonally disposed slot portions.

4. A bracket for a lamp casing in the form of a plate provided with oppositely disposed slots having enlarged portions for the insertion of the heads of bolts for securing the device in position, each of said slots comprising two portions at right angles with respect to each other, such portions being connected together by concentric arc shaped slot portions.

5. A bracket for a lamp casing in the form of a plate provided with oppositely disposed slots having enlarged portions for the insertion of the heads of bolts for securing the device in position, each of said slots comprising two portions at right angles with respect to each other, such portions being connected together by concentric arc shaped slots, and the straight portions of one slot being in alignment with the straight portions respectively of the other slot.

OLIVER C. RITZ WOLLER.